(12) United States Patent
Sinfield

(10) Patent No.: US 6,826,819 B1
(45) Date of Patent: Dec. 7, 2004

(54) METHOD FOR MAKING A VENTLESS TIRE MOLD

(75) Inventor: Carl J. Sinfield, Massillon, OH (US)

(73) Assignee: Quality Mold, Inc., Akron, OH (US)

( * ) Notice: Subject to any disclaimer, the term of this patent is extended or adjusted under 35 U.S.C. 154(b) by 212 days.

(21) Appl. No.: 09/703,243

(22) Filed: Nov. 1, 2000

(51) Int. Cl.$^7$ ............................................. B29C 35/00
(52) U.S. Cl. .................... 29/463; 29/527.5; 425/46; 425/28.1
(58) Field of Search ............... 29/428, 445, 463, 29/527.5, 527.6; 425/46, 28.1, 47, 812

(56) References Cited

U.S. PATENT DOCUMENTS

| | | | | |
|---|---|---|---|---|
| 4,154,564 A | * | 5/1979 | French | 425/46 |
| 4,691,431 A | * | 9/1987 | Hayata | 249/135 |
| 5,234,326 A | * | 8/1993 | Galli et al. | 425/46 |
| 5,290,163 A | * | 3/1994 | Katsumata et al. | 425/47 |
| 5,327,953 A | * | 7/1994 | Ichiki | 425/46 |
| 5,866,171 A | * | 2/1999 | Kata | 425/46 |
| 5,950,700 A | * | 9/1999 | Fukuoka | 425/35 |
| 6,026,875 A | * | 2/2000 | Diensthuber et al. | 425/46 |
| 6,202,725 B1 | * | 3/2001 | Moriya | 425/46 |
| 6,220,844 B1 | * | 4/2001 | Kusano | 425/46 |
| 6,250,901 B1 | * | 6/2001 | Nagata | 425/46 |
| 6,315,018 B1 | * | 11/2001 | Watanabe | 152/209.21 |
| 6,382,943 B1 | * | 5/2002 | Metz et al. | 425/46 |

* cited by examiner

*Primary Examiner*—Marc Jimenez
(74) *Attorney, Agent, or Firm*—Renner Kenner Greive Bobak Taylor & Weber

(57) ABSTRACT

A tire molding apparatus and technique is provided for the ventless molding of tires. According to the invention, a series of pitches is formed in an appropriate REN board, plaster, or like material with the implementation of a CNC machine. An aluminum pour casting is made from the model in which the various pitches are separated by voids which allow for the entry of a cutting tool such that each individual pitch or tire tread segment can be cut from the aluminum casting. Sipe locations are then cut into the model. Master rubbers or foundry tooling is then created and the castings poured. The individual pitches are then matingly interengaged in a puzzle-like fashion along the interior of a tire mold to define the tread portion of the mold. Venting of the mold is achieved at the pitch line formed at the intersection of each of the pitches.

4 Claims, 5 Drawing Sheets

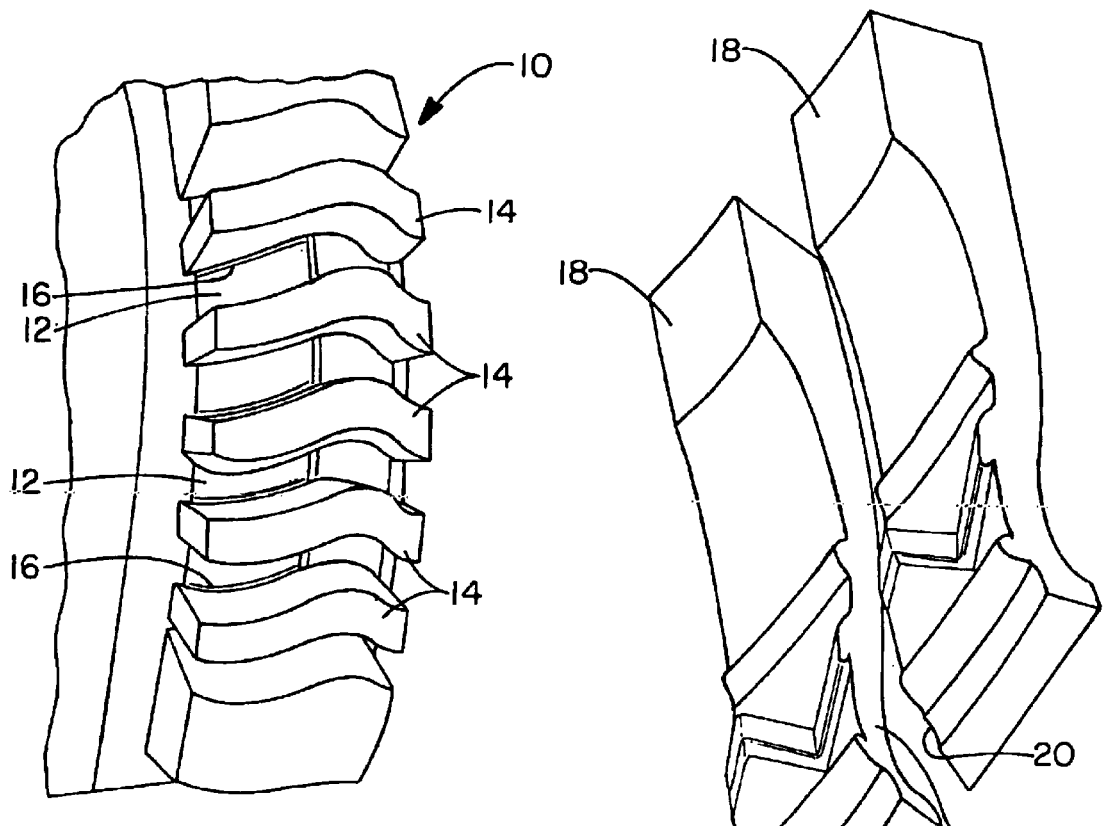
FIG.-1
FIG.-2
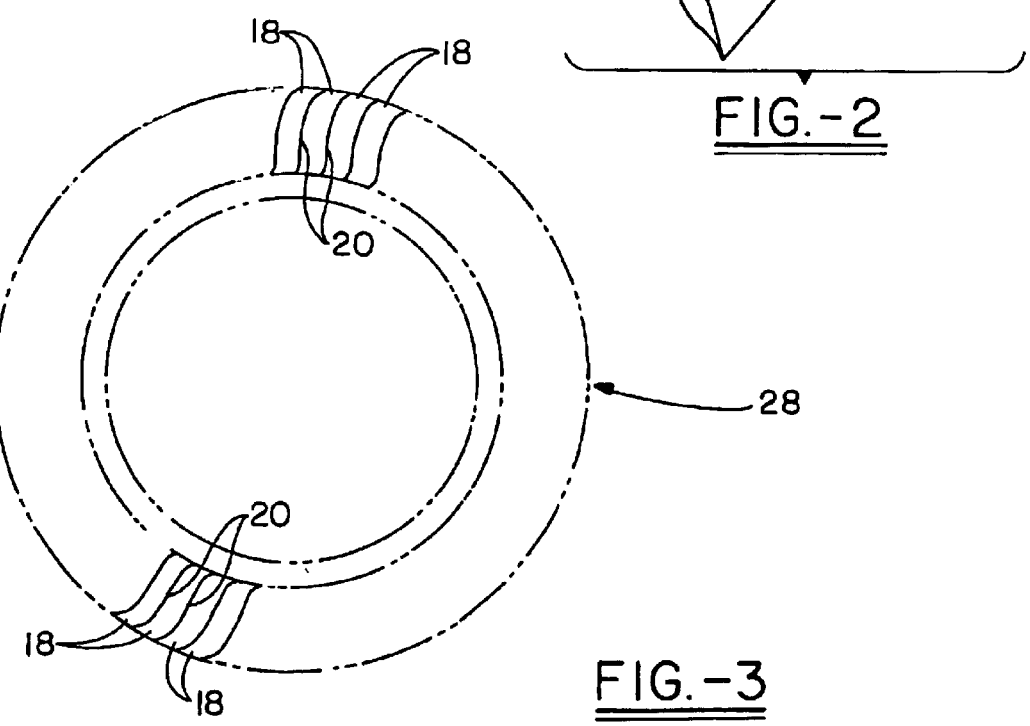
FIG.-3

METHOD FOR MAKING A VENTLESS TIRE MOLD

TECHNICAL FIELD

The invention herein resides in the art of tire molding apparatus and techniques. More particularly, the invention relates to a ventless tire mold. More specifically, the invention presents a ventless tire mold which is made of a plurality of interconnecting pitches, with the interface of the pitches serving as vent lines for the mold cavity.

BACKGROUND ART

It is well known that the manufacture of pneumatic tires typically requires the implementation of a mold and associated tire presses to form the tire tread in the green rubber and to hold the tire configuration while the green tire cures. In the past, the preparation of tire molds has generally been extremely labor intensive and involved highly skilled manual labor, both resulting in significant cost in the development of a tire mold.

In the past, it has generally been known to employ a hand carver a computerized numeric controller (CNC) machine to make a master model of an appropriate material such as REN board, plaster, or the like. From the master model, foundry tooling is made and ultimately from the foundry tooling cores are developed. As is understood by those skilled in the art, a core is a sequence of pitches or tire tread elements. An appropriate number of cores with the requisite pitch sequences for the desired tread pattern were necessarily generated. These cores were then mated in the proper diameter and pitch sequence to define the requisite mold. This assembly was then cured and employed to make castings, from which the molds themselves could ultimately be made.

In the prior art process of casting tire cores, a number of shortcomings were present. Generally, undercuts were inpossible to achieve except by tedious handwork. However, such undercuts are common in tire designs where sipes must be employed. Additionally, prior art molds necessarily required a large number of pinhole vents to allow air to escape from the mold as the tire was expanded into the mold during the curing operation. These pinhole vents required continuous cleaning and removal of cured rubber to prevent such blockage from impairing the efficiency of the mold.

As one can readily appreciate, these prior art mold designs are extremely time consuming and costly to manufacture, implement and maintain. Accordingly, there is a need in the art for a tire molding apparatus and technique which overcomes these shortcomings of the prior art.

SUMMARY OF INVENTION

In light of the foregoing, it is a first aspect of the invention to provide a tire molding apparatus and technique which is of a ventless nature.

Another aspect of the invention is the provision of a tire molding apparatus and technique in which segments of the tire mold are assembled single pitches, rather than cores.

Still a further aspect of the invention is the provision of tire molding apparatus and technique in which the venting of the mold is at the pitch line formed at the intersection of mating pitches, rather than through the addition of pinhole vents.

Still a further aspect of the invention is the provision of a tire molding apparatus and technique in which a model is made of a REN board, plaster or the like, sipes are set in the model itself then traditional master rubbers can be made.

A further aspect of the invention is the presentation of a tire molding apparatus and technique in which a mold may be developed by casting of single pitches, rather than entire cores.

Still a further aspect of the invention is the provision of a tire molding apparatus and technique which is readily conducive to implementation with state of the art materials and processes.

The foregoing and other aspects of the invention which will become apparent herein are achieved by a ventless tire mold, comprising: a plurality of mold segments nestingly interconnecting with each other at segment interferences to form an annular mold, said segment interfaces defining air passages from an interior of said annular mold.

Other aspects of the invention which will become apparent herein are attained by a method for making a ventless tire mold, comprising: (a) developing three dimensional models of tire tread portions; (b) installing sipes into the models; (c) generating foundry castings from the siped models; (d) preparing individual pitch profiles from said foundry castings; and (e) assembling a mold by nestingly interconnecting a plurality of said prepared individual pitch profiles.

DESCRIPTION OF THE DRAWINGS

For a complete understanding of the objects, techniques and structure of the invention reference should be made to the following detailed description and accompanying drawings wherein:

FIG. 1 is a perspective view of an aluminum casting of a plurality of pitches made in accordance with the invention;

FIG. 2 illustrates a pair of pitches cut from a casting such as that shown in FIG. 1;

FIG. 3 is a perspective view of half of a mold made by sequentially inter-fitted pitches.

BEST MODE FOR CARRYING OUT THE INVENTION

Figure 4:
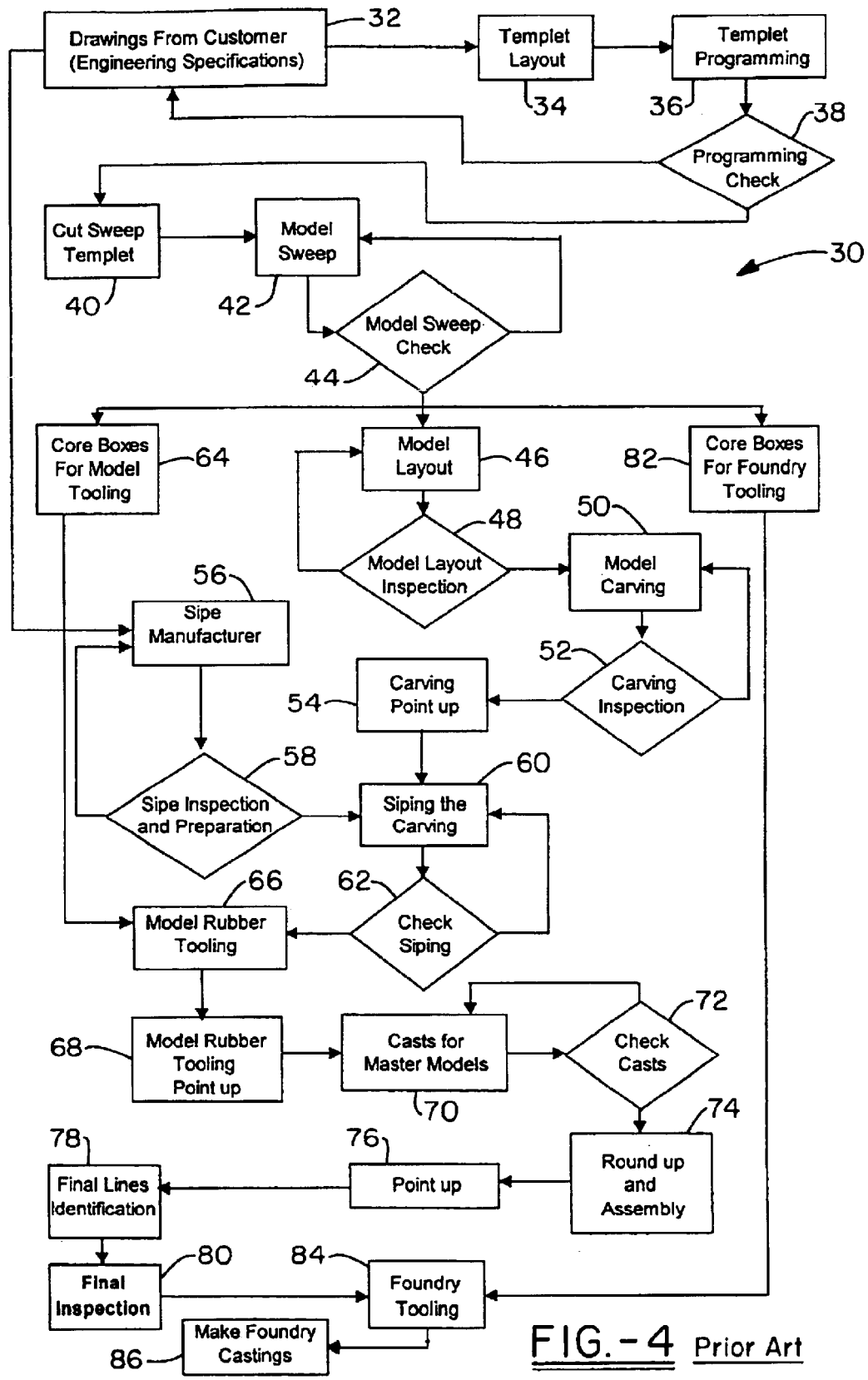
FIG. 4 is a flow chart of the tire mold/model casting process according to the prior art.

In accordance with the concept of the present invention, a tire mold will be made of a plurality of interconnected pitches, each pitch constituting a segment of a tire tread, and wherein the pitch lines defined by the mating interfaces of the pitches serve as air passage vents for the tire mold cavity. In effect, the tire mold is made in a puzzle-like fashion with the pitches comprising the pieces of the puzzle that inter-fit with each other to ultimately define the mold, and in which the interfaces between the puzzle pieces serve as mold vents.

In accordance with the invention, a model is made by carving a REN board, plaster, or the like by use of a multi-axis CNC machine in somewhat standard fashion. The carving in the REN board, plaster, or the like is a sequence of pitches having void spaces between them so that a tool path is present to cut each of the individual pitches along the pitch line. Once the pitches are cut, undercut ribs for incorporating sipes in the model may be easily achieved.

As shown in FIG. 1, an aluminum casting 10 can be made from the model of REN board, plaster, or the like in somewhat standard fashion. The aluminum casting 10 includes a plurality of pitches 12 separated by separator blocks 14. The voids between the blocks 14 and above pitches 12 allow for entry of an appropriate cutting tool to cut the pitches along the cut lines 16 defined by the intersection of the separator blocks 14 and pitches 12. As a consequence, the individual pitches 18, as shown in FIG. 2, are developed. As illustrated, the vertical sides 20 of the pitches 18 are contoured to mate with each other and are defined by the cut lines 16 as presented in FIG. 1. The vertical sides 20 define the pitch lines by which various pitches 18 nest with each other.

The nesting of the various pitches 18 to form the tread portion of a tire mold is illustratively shown in FIG. 3. Here, it can be seen that one half of a tire mold made in accordance with the invention is designated generally by the numeral 28. It will be appreciated by those skilled in the art that the tire mold 28 is typically of but not limited to the clamshell type mold, comprising upper and lower clamshell halves that are brought into sealing engagement with each other with a green tire carcass therein. This same process in creating models and mold parts may also be used in segmented molds. The tire mold being of a clamshell or segmented type is held shut by an appropriate tire press and the green tire is inflated by a bladder and urged against the inner walls of the tire mold. In this instance, the tread portion of the tire mold 28 is defined by a plurality of abuttingly interconnecting pitches 18, each abutting at pitch lines 20 defined by the interface of the vertical sides of the pitches themselves. These interfaces provide air passages for venting of the mold as the tire mold bladder is inflated to urge the green tire carcass into conforming engagement with the inner surface of the mold 28, and particularly the annular array of pitches 18.

Those skilled in the art will readily appreciate the simplicity by which the puzzle mold of the instant invention may be configured. Rather than devise a plurality of cores of appropriate diameter and pitch sequence for interfitting to define a mold, individual pitches may be made from a CNC carved model of REN board, plaster, or like material and then by a subsequent pour casting technique. The aluminum cast pitches, defined by voids therebetween, may then be easily cut from the aluminum casting so made, with each of the pitches then being easily operated upon to provide undercuts for sipes or the like in each individual pitch element. The various pitches 12 are then also machined for close nesting engagement with each other and to a desired smooth release surface for formation of and engagement with the tire tread. Moreover, the multitude of pinhole vents previously employed in the previous art have been eliminated, greatly reducing the cost of not only manufacturing the mold, but maintaining it.

An appreciation of the advantages of the instant invention over the process and techniques of the prior art can best be achieved by a comparison of the two through reference to FIGS. 4–7. As shown in FIG. 4, the prior art process for manufacturing the tire mold model/casting is designated generally by the numeral 30. As shown, engineering specifications for the associated tire are received from the customer, such as a tire manufacturer as designated at 32. Template layout and program is then undertaken and checked until the template layout is deemed satisfactory as at 34–38. The sweep template is then cut at 40 and the model is swept and checked at 42–44. Only then, can a model layout be made at 46. But that process includes repeated inspection and modification until the model layout is deemed satisfactory at 48.

After the model layout is complete, model carving and inspection is undertaken at 50–52 until a suitable carving is obtained. The carving is finished by point up at 54.

Those skilled in the art will also appreciate that the specification received from the customer at 32 also includes the specification regarding the sipes necessary for the model rubber tooling. Those specifications are passed to a sipe manufacturer at 56, who undertakes sipe preparation and inspection until the sipes are complete at 58. The sipes are then placed onto the carving at 60 and checked for accuracy at 62.

The core boxes for the model tooling are determined at 64 following model sweep check 44. The model rubber tooling is then prepared at 66 from the siped carving and the model rubber tooling is pointed up at 68 into a finished structure for casting of the master models at 70. The castings are checked at 72, round up and assembly undertaken at 74 and the casting pointed up at 76. Finishing of master model is undertaken at 78 where all of the final lines of the model are finished. Following final inspection at 80, the foundry tooling is prepared at 84 and the foundry castings made at 86.

Figure 5:
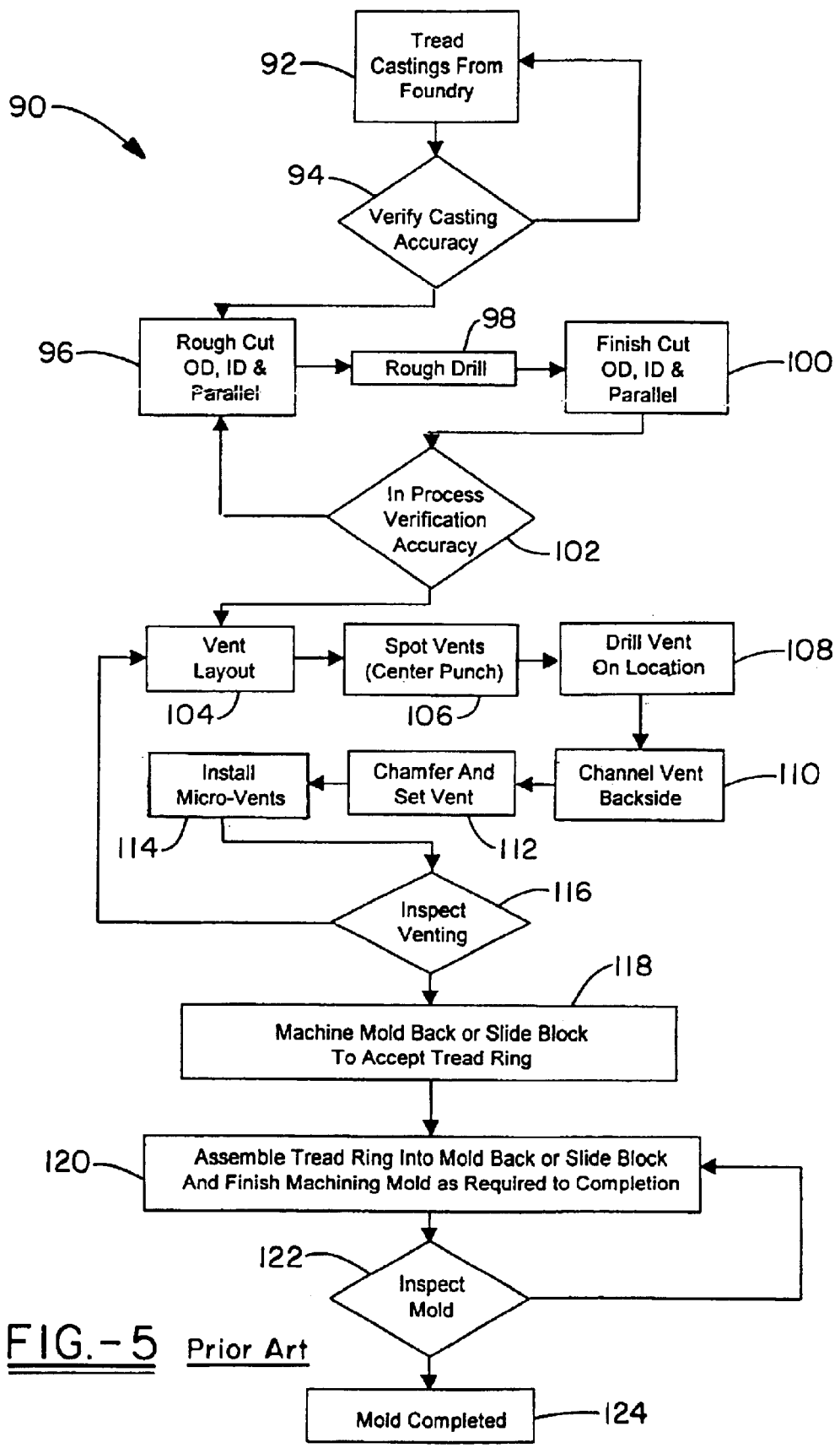
FIG. 5 is a flow chart of the mold machining process of the prior art.

With reference now to FIG. 5, it can be seen that the tread castings completed at 86 are received from the foundry at 92 and verified for accuracy at 94. Rough cuts on the castings are made for outside diameter, inside diameter, and parallel sides at 96. They are then rough drilled at 98 and finished at 100. Following an in process inspection for verification of accuracy at 102 the vent layouts are prepared at 104. Spot vents are prepared by center punch at 106 and vent holes are drilled on location at 108. The vent backside is channeled at 110 and the vent is chamfered and set at 112. Thereafter, the micro-vents are installed at 114 at the numerous vent locations just prepared. The vents are inspected at 116 and reworked at 104–114 until the vents have all been approved.

Next in the process, the mold back or slide block is machined to accept the requisite tread ring at 118 and the tread ring is then assembled into the mold back or slide block and final machining is undertaken at 120. The mold is inspected at 122 and any necessary further machining is undertaken until the mold is deemed acceptable. The mold is then completed at 124 for tire manufacturing.

Figure 6:
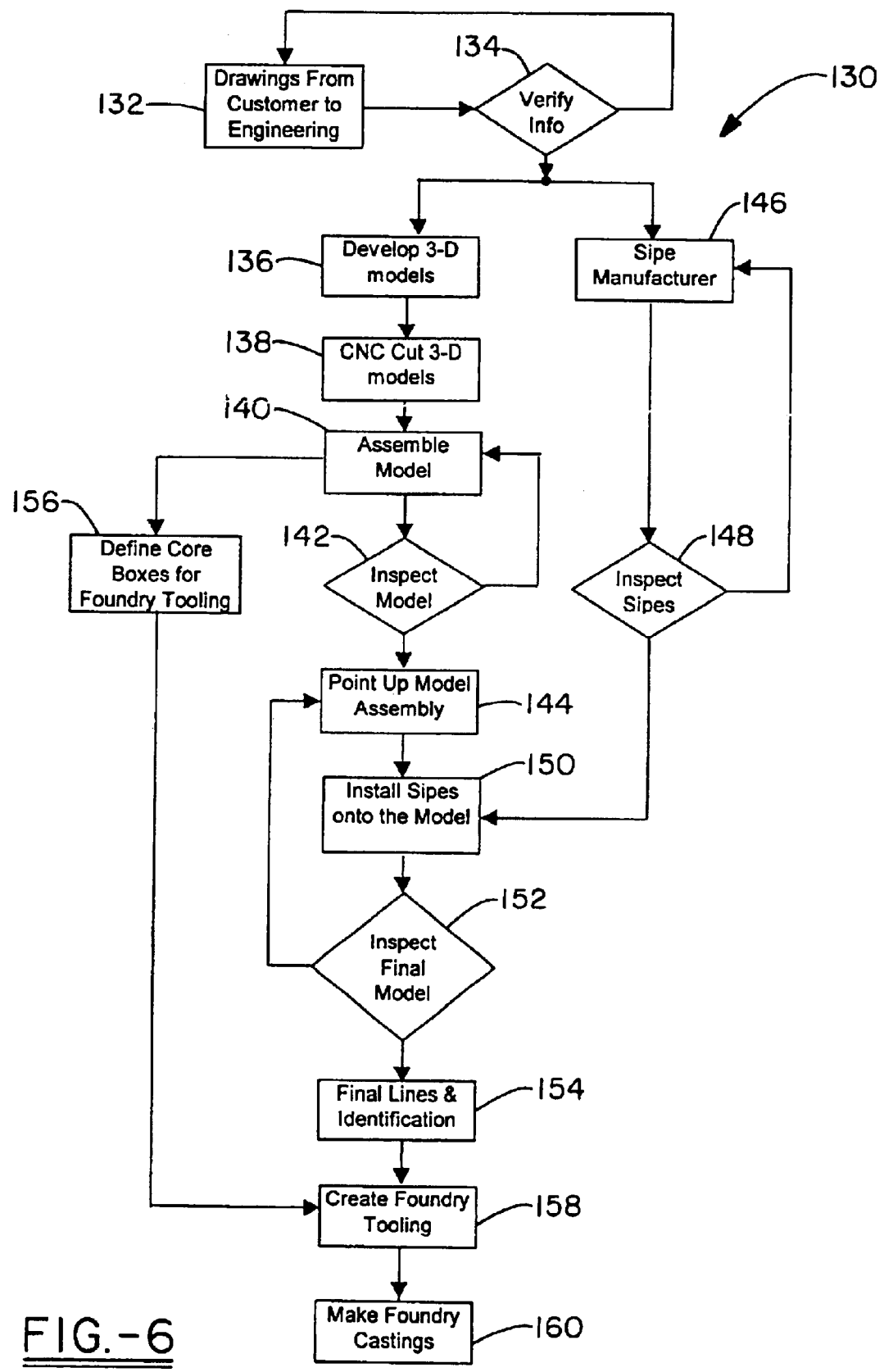
FIG. 6 is a flow chart of the tire mold/model casting process according to the invention.
Figure 7:
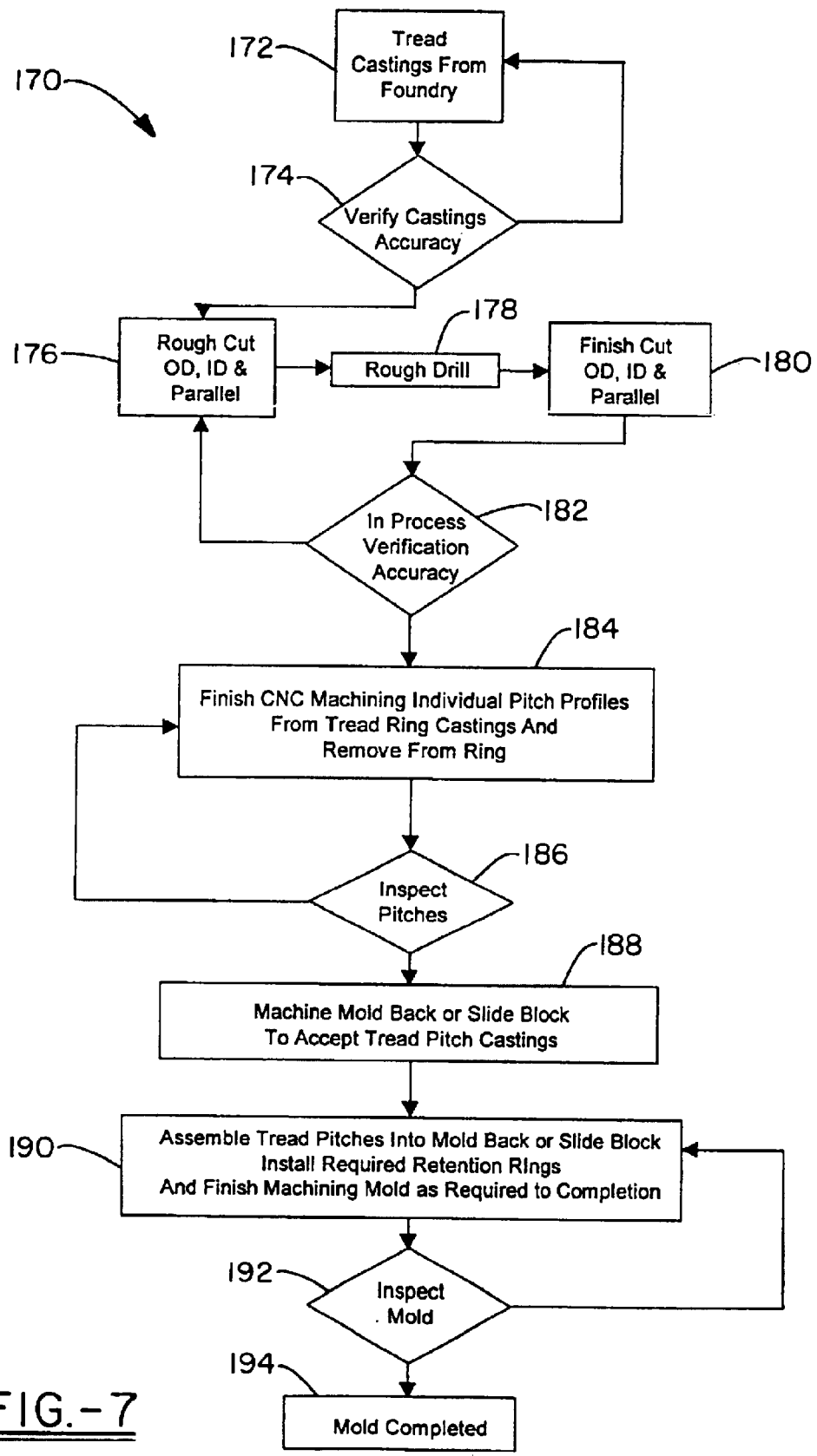
FIG. 7 is a flow chart of the mold machining process according to the invention.

In contrast to the labor intensive methodology for prior tire mold development, including the placement of a multitude of tire vents, is the process of the instant invention as shown in flow chart form in FIGS. 6 and 7.

With reference now to FIG. 6, an appreciation of the manufacturing process for the ventless tire mold/model casting according to the instant invention can be seen as designated by the numeral 130. Again, drawings or engineering specifications are received from the customer at 132 and a verification of the information so received is made at 134. Three dimensional models are then developed at 136 and a multi-axis CNC machine is employed to cut the models at 138. The model is assembled at 140 and inspected at 142. The model assembly is pointed up at 144 and readied for receipt of the requisite sipes. As will be appreciated by those skilled in the art, information respecting the sipes was received in the way of specifications from the customer at 132, verified at 134, and delivered to a sipe manufacturer at 146. The sipes are inspected upon receipt at 148 and then installed into the pointed up model assembly at 150. The final model is inspected at 152 and any additional modifications made. The final lines are imparted at 154.

It will further be appreciated by those skilled in the art that once the model is assembled at 140, the core boxes for foundry tooling can be defined at 156 such that the foundry tooling can be devised at 158 from the finished model. The foundry castings are then prepared at 160.

With reference now to FIG. 7, the process 170 shows receipt of the tread castings from the foundry at 172 and verification of the same for accuracy at 174. Rough cutting of the outside diameter, inside diameter and parallel surfaces is undertaken at 176, rough drilling at 178 and finished cutting a 180. With verification for accuracy being undertaken at 182.

In stark contradistinction to the prior art, at 184 finished CNC machining of individual pitch profile from tread ring casting is undertaken and the pitch profiles are removed from the tread casting ring at 184. Each of the individual pitches is inspected at 186 and further machining undertaken until the requisite machining is complete. The mold back or slide block is then machined to receive and accept each of the various tread pitch castings until completed at 188. Tread pitches are then assembled into the mold back or slide block at 190 with appropriate retention rings to retain each of the pitches therein. Finished machining of the mold as required for completion is also undertaken at 190. The mold is inspected at 192 and necessary further machining undertaken. The tire mold, comprised of a multitude of interconnected and interfaced pitches, is completed at 194.

Following the process of the instant invention, a mold comprising a plurality of interfaced pitches is achieved, with the venting of the mold being accomplished at the pitch interfaces, thus obviating the need for drilling, finishing, and placing of micro-vents throughout the mold itself. Moreover, maintenance of the mold is simplified since periodic cleaning of the micro vents is obviated.

Thus it can be seen that the objects of the invention have been satisfied by the structure presented above. While in accordance with the patent statutes, only the best mode and preferred embodiment of the invention has been presented and described in detail, the invention is not limited thereto or thereby. Accordingly, for an appreciation of the true scope and breadth of the invention, reference should be made to the following claims.

What is claimed is:

1. A method for making a ventless tire mold, comprising:
   (a) developing three dimensional models of tire tread portions;
   (b) installing sipes into the models;
   (c) generating foundry castings from the models having the sipes installed;
   (d) preparing individual pitch profiles from said foundry castings; and
   (e) assembling a mold by nestingly interconnecting a plurality of said prepared individual pitch profiles.

2. The method for making a ventless tire mold according to claim 1, wherein said three dimensional models are cut by a multi-axis CNC machine.

3. The method for making a ventless tire mold according to claim 2, wherein each said tire tread portion corresponds to a pitch.

4. The method for making a ventless tire mold according to claim 3, wherein undercut ribs are formed in said tire tread portions for receiving said sipes.

* * * * *